United States Patent
Bakhuis et al.

(10) Patent No.: US 7,798,780 B2
(45) Date of Patent: Sep. 21, 2010

(54) MODULARLY CONSTRUCTED ROTORBLADE AND METHOD FOR CONSTRUCTION

(75) Inventors: Jan Willem Bakhuis, Nijverdal (NL); Andrew John Billen, Daarlerveen (NL); Sjef van Breugel, Overijssel (NL); Jamie Thomas Livingston, Pensacola, FL (US)

(73) Assignee: General Electric Company, Schenectady, NY (US)

( * ) Notice: Subject to any disclaimer, the term of this patent is extended or adjusted under 35 U.S.C. 154(b) by 422 days.

(21) Appl. No.: 11/311,053

(22) Filed: Dec. 19, 2005

(65) Prior Publication Data

US 2007/0140858 A1    Jun. 21, 2007

(51) Int. Cl.
*F03D 11/00*    (2006.01)

(52) U.S. Cl. .................................. 416/223 R; 416/226

(58) Field of Classification Search ............ 416/1, 416/223 R, 224, 226, 229 R
See application file for complete search history.

(56) References Cited

U.S. PATENT DOCUMENTS

| | | | |
|---|---|---|---|
| 2,457,889 A * | 1/1949 | Gruetjen | 29/889.6 |
| 2,869,649 A | 1/1959 | Lux | |
| 2,941,604 A | 6/1960 | Marriage | |
| 3,042,371 A * | 7/1962 | Fanti | 416/132 R |
| 3,466,725 A * | 9/1969 | Kock | 29/889.71 |
| 3,967,996 A * | 7/1976 | Kamov et al. | 156/156 |
| 4,389,162 A | 6/1983 | Doellinger et al. | |
| 4,643,646 A | 2/1987 | Hahn et al. | |
| 4,732,542 A | 3/1988 | Hahn et al. | |
| 4,820,117 A * | 4/1989 | Larrabee et al. | 415/142 |
| 5,522,702 A | 6/1996 | Kemsley et al. | |
| 5,839,882 A | 11/1998 | Finn et al. | |
| 6,976,829 B2 | 12/2005 | Kovalsky et al. | |
| 7,179,059 B2 | 2/2007 | Sorensen et al. | |
| 7,186,086 B2 | 3/2007 | Yoshida | |
| 7,334,989 B2 * | 2/2008 | Arelt | 416/2 |
| 2004/0253114 A1 | 12/2004 | Gunneskov et al. | |
| 2006/0127222 A1 | 6/2006 | Arelt et al. | |
| 2006/0243382 A1 | 11/2006 | Kilwin et al. | |
| 2006/0285937 A1 | 12/2006 | Wobben | |
| 2007/0253824 A1 | 11/2007 | Eyb | |
| 2009/0070977 A1 | 3/2009 | Livingston | |

FOREIGN PATENT DOCUMENTS

WO    2006/002621 A1    1/2006

* cited by examiner

*Primary Examiner*—Edward Look
*Assistant Examiner*—Dwayne J White
(74) *Attorney, Agent, or Firm*—Cantor Colburn LLP

(57) ABSTRACT

Disclosed is a modularly constructed rotorblade including a leading and a trailing edge, including a plurality of rotorblade sections in bonded association, and at least one bonding line disposed away from continuous contact with the leading edge and the trailing edge.

19 Claims, 9 Drawing Sheets

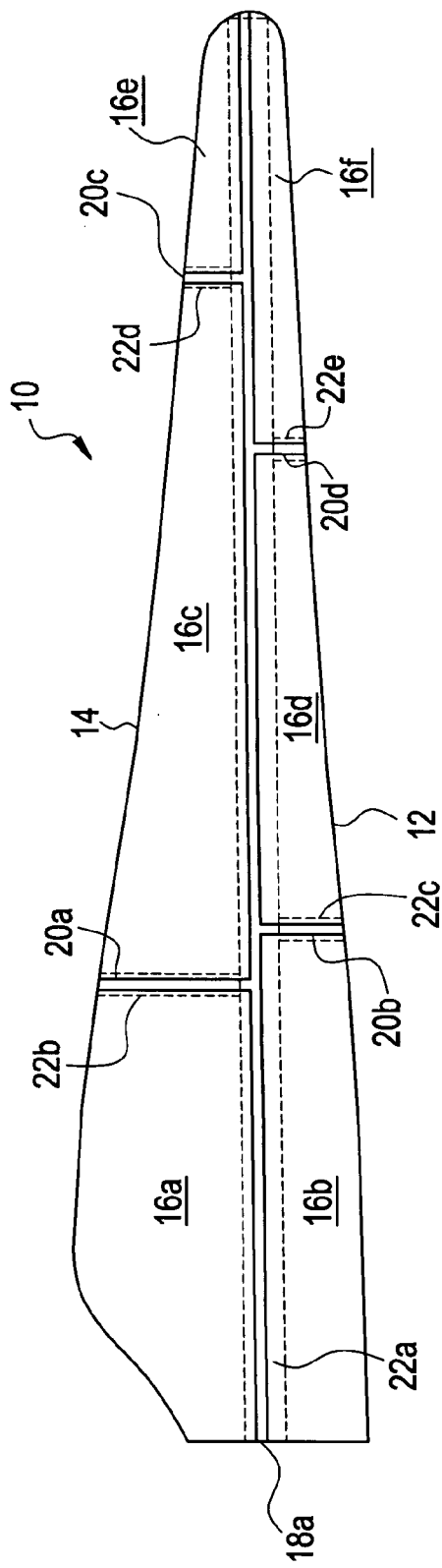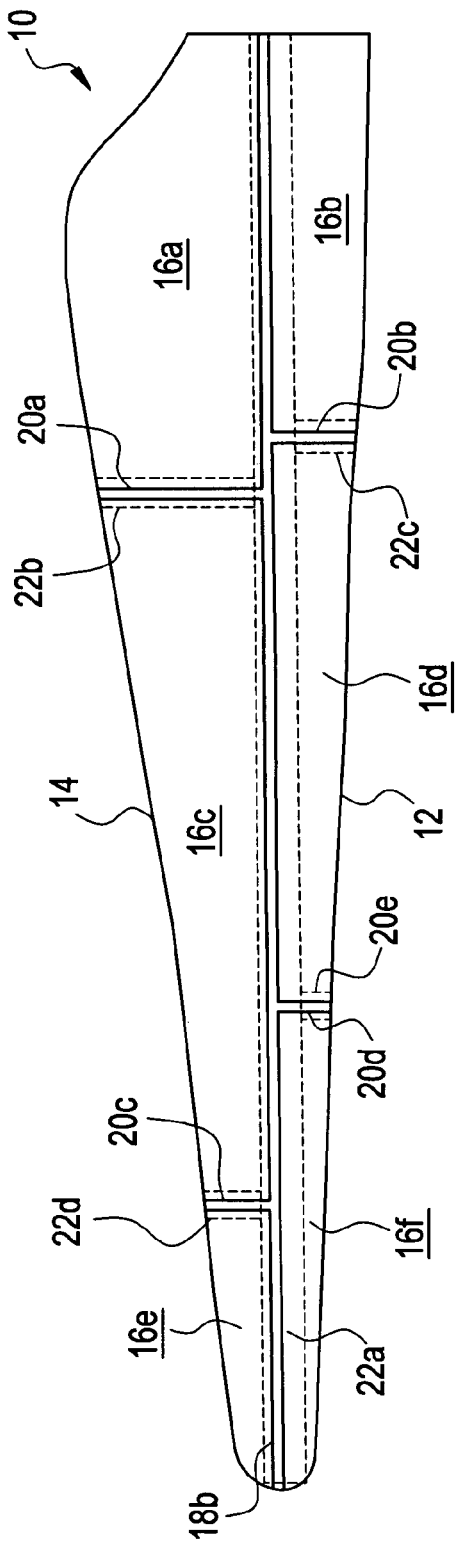

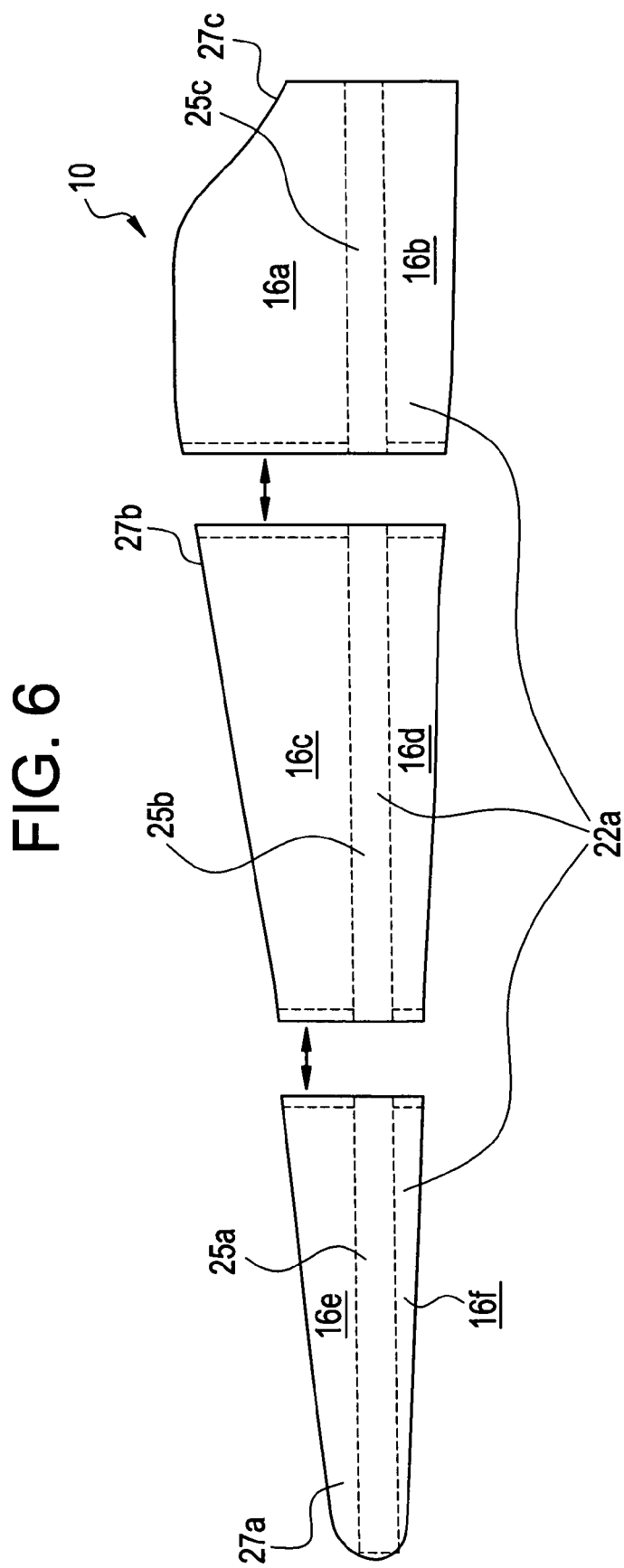

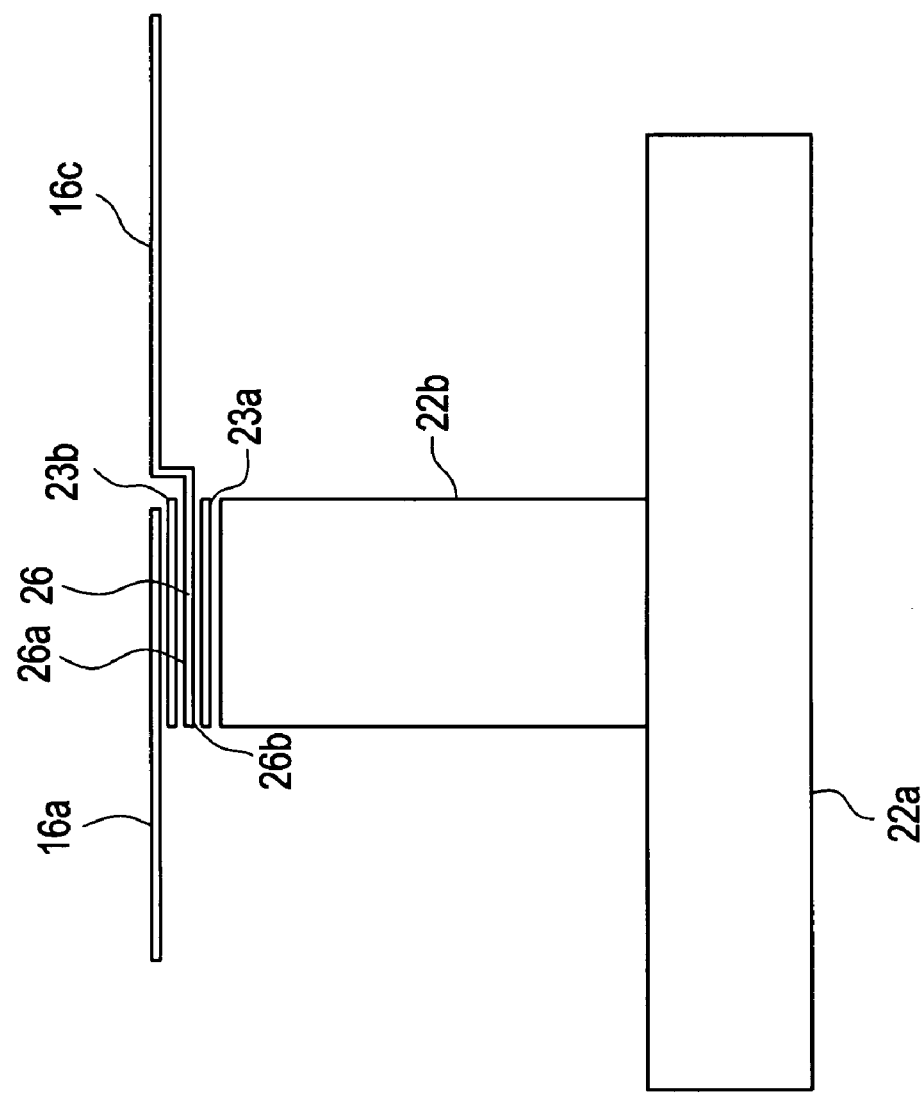

US 7,798,780 B2

MODULARLY CONSTRUCTED ROTORBLADE AND METHOD FOR CONSTRUCTION

FIELD OF THE INVENTION

This disclosure relates generally to a rotorblade, and more particularly to rotorblade construction.

BACKGROUND OF THE INVENTION

Rotorblades, such as those used in wind turbines, are typically constructed by molding two sections or halves of the blade, and then bonding the halves using an adhesive. The two halves are bonded continuously along the leading and trailing edges of the blade using a relatively thick line of adhesive. These blades, and their respective halves can be very large measuring over 100 feet in length.

While blades as described above are commercially accepted, there are field performance and efficiency issues that are related to the current construction and bonding of these large blades. One such issue pertains to the creation of a bonding line continuously along the leading and trailing edges of the blade. Bonding along the leading and trailing edges using a thick adhesive increases the possibility for surface abnormality or defect at these aerodynamically critical points. These surface abnormalities impact field performance of the blade, including erosion at the leading edge bonding line. Another issue pertains to the relatively large length of the pre-bonded blade halves. Molding blades in such large blade sections (halves) leads to inefficient tooling costs in that each section involves a protracted molding process that requires extensive preparation, and thus slow turnaround. In addition, these blades or blade halves must be transported to various sites for further assembly and/or use, and transportation of such lengthy structures can lead to high transportation expenditures, as they are difficult to haul via conventional tractor-trailers. For the foregoing reasons, a method for creating smaller rotorblade sections not having the foregoing drawbacks is desirable.

BRIEF DESCRIPTION OF THE INVENTION

Disclosed is a modularly constructed rotorblade including a leading and a trailing edge, including a plurality of rotorblade sections in bonded association, and at least one bonding line disposed away from continuous contact with the leading edge and the trailing edge.

Also disclosed is a method for constructing a modular rotorblade, including bonding a plurality of blade sections along at least one bonding line, wherein the at least one bonding line is disposed away from continuous contact with a leading edge and a trailing edge.

Further disclosed is a method for constructing rotorblades, including associating a plurality of blade sections with an internal blade frame, wherein the internal blade frame includes at least one subassembly, and bonding the plurality of blade sections along at least one bonding line, wherein the at least one bonding line is disposed away from continuous contact with a leading edge and a trailing edge of a rotorblade. Additionally disclosed is a method for constructing rotorblades including associating at least one of a plurality of blade sections with a portion of an internal blade frame to create a plurality of assembled rotorblade portions, wherein the blade frame includes at least one subassembly, and bonding the plurality of assembled rotorblade portions along at least one bonding line, wherein the at least one bonding line is disposed away from continuous contact with a leading edge and a trailing edge of a rotorblade.

BRIEF DESCRIPTION OF THE DRAWINGS

The foregoing and other features and advantages of the present invention should be more fully understood from the following detailed description of illustrative embodiments taken in conjuncture with the accompanying Figures in which like elements are numbered alike in the several Figures:

FIG. 4 is a side perspective view of the modularly constructed rotorblade including a blade frame in accordance with the exemplary embodiment;

FIG. 5 is a side perspective view, opposite of the side in FIG. 4, of the modularly constructed rotorblade including the blade frame in accordance with the exemplary embodiment;

FIG. 6 is a side perspective view of the modularly constructed rotorblade including a plurality of detachable spine subassembly portions in accordance with the exemplary embodiment FIG. 7 is a side perspective view of a subassembly in accordance with the exemplary embodiment;

DETAILED DESCRIPTION OF THE INVENTION

Figure 1:
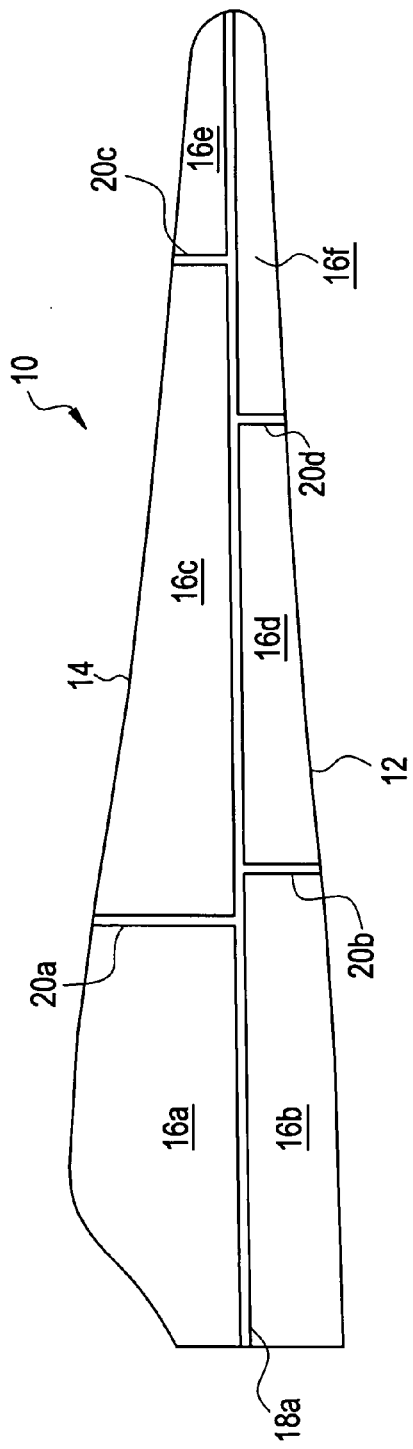
FIG. 1 is a side perspective view of a modularly constructed rotorblade in accordance with an exemplary embodiment.
Figure 2:
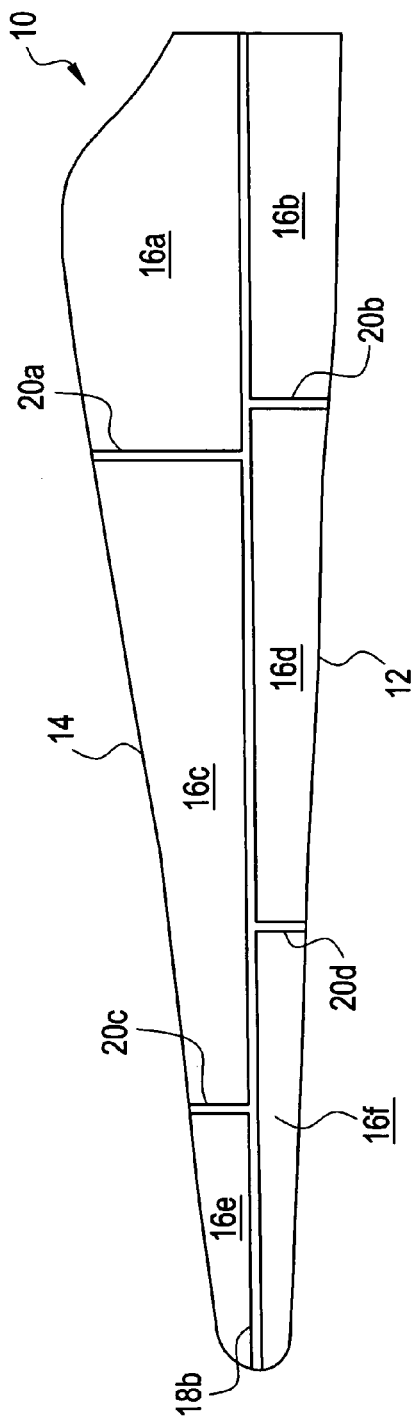
FIG. 2 is a side perspective view, opposite of the side in FIG. 1, of the modularly constructed rotorblade in accordance with the exemplary embodiment.

Referring to FIG. 1 and FIG. 2, an exemplary embodiment of a modularly constructed rotorblade 10 is illustrated and includes a leading edge 12, a trailing edge 14, and a plurality of rotorblade sections in bonded association. At least one bonding line is representative of a seam or region at which the plurality of rotorblade sections are bonded (i.e. where the bonded associations take place), wherein any adhesive bonding substance necessary to the desired end purpose may be used. Each of the at least one bonding line is disposed away from continuous contact with the leading edge 12 and/or the trailing edge 14 of the rotorblade 10. This disposal away from continuous contact with the leading edge 12 and/or the trailing edge 14 does not exclude bonding lines that intersect the leading edge 12 and/or trailing edge 14, but does exclude lines that run in continuous contact (or continuously along) the leading edge 12 and/or trailing edge 14. By disposing the at least one bonding line away from continuous contact with the leading or trailing edge, there is less chance for surface abnormality (from mismatching halves during bond process) in these aerodynamically critical areas, improving field performance.

Though field performance of a rotorblade will be improved if that rotorblade comprises only a single bonding line disposed away from continuous contact with the leading edge 12 and/or the trailing edge 14 to bond two rotorblade sections (plurality), a rotorblade comprising at least three rotorblade sections bonded via at least three bonding lines disposed away from continuous contact with the leading edge 12 and/ or the trailing edge 14 will offer additional improvement in that rotorblade's constructability. Referring to FIG. 1 and FIG. 2, at least one bonding line is illustrated as bonding lines 18a-b and intersecting bonding lines 20a-d, and the plurality of rotorblade sections are illustrated as sections 16a-f. By constructing the rotorblade 10 to include more than two rotorblade sections (six in the illustration), rotorblade section length is decreased, allowing for easier and less costly transportation of each rotorblade section, as well as decreasing molding time per section, improving molding tool turn-around time.

Furthermore, incorporation of bonding lines that do not run substantially parallel to the leading edge 12 and trailing edge 14 (i.e. lengthwise in relation to a blade), such as the intersecting bonding lines 20a-d, allows for greater rotorblade section interchangeability within a specific rotorblade. For example, the rotorblade 10 could be constructed without the sections 16e and 16f, and the remaining sections could be bonded with other experimental, more desirable, or more environmentally applicable blade tip sections. Similar mixing and matching could occur with the blade root sections 16a and 16b. It should be appreciated however, that despite any advantages gained by specific rotorblade section/bonding line number and/or bonding line direction, the rotorblade 10 may include any number of bonding lines and rotorblade sections, wherein the bonding lines may be disposed in any direction, parallel, perpendicular, or otherwise related to the leading edge 12 and the trailing edge 14, as long as they are disposed away from continuous contact with the leading edge 12 and the trailing edge 14.

Figure 3:
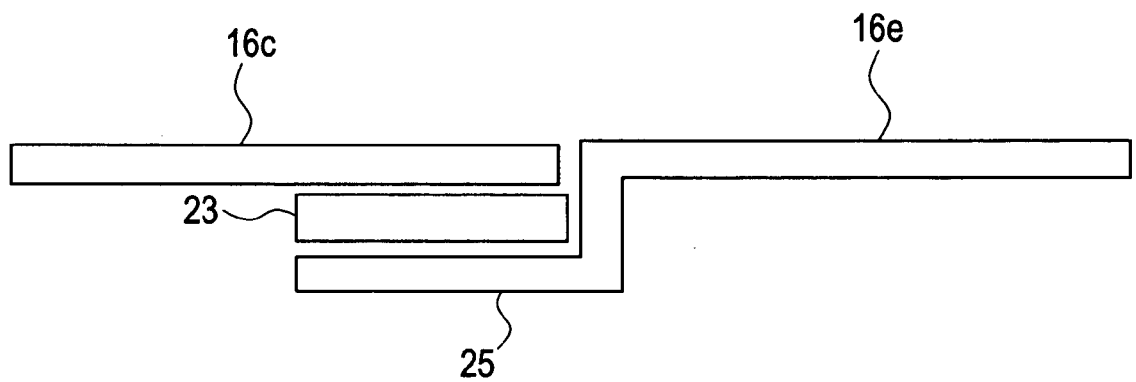
FIG. 3 is a side perspective view of a bonding line in accordance with the exemplary embodiment.

It should also be appreciated that bonding along at least one bonding line can be accomplished as shown in FIG. 3, wherein at least one of the plurality of rotorblade sections, such as the section 16e, includes at least one flange, such as flange 25. The flange 25 is bonded to section 16c via an adhesive 23. Modularly bonding the plurality of rotorblade sections (particularly when there are at least three rotorblade sections) decrease the length of the at least one bonding line in relation to a bonding line that runs continuously along the length of a leading/trailing edge. Decreasing the length of at least one bonding line allows for better alignment of the plurality of rotorblade sections, improving blade aerodynamics.

Referring now to FIG. 4 and FIG. 5, an additional advantage in constructing the rotorblade 10 will be achieved via inclusion of a blade frame internal to the rotorblade 10, wherein the internal blade frame includes at least one subassembly. The at least one subassembly may further include at least one spine subassembly and at least one transverse subassembly, illustrated as subassemblies 22a-e, with the subassembly 22a acting as a spine for the subassemblies 22b-e. The internal blade frame and/or subassemblies 22a-e act as a pre-construction skeleton and support that aids in configuring the plurality of sections, such as sections 16a-f, before and during bonding of each section. When at least three rotorblade sections are employed in the rotorblade 10, such as the six sections 16a-f illustrated, support for the sections 16a-f as each is added and bonded to the rotorblade 10 is beneficial to the construction (particularly benefiting blade section alignment) process. The plurality of blade sections are associated with the at least one subassembly along at least one bonding line.

The spine subassembly 22a may consist of one unitary structure associated with at least one transverse subassembly 22b-c to which the plurality of blade sections 16a-f is attached. Referring to FIG. 6, the spine subassembly 22a may also consist of a plurality of spine subassembly portions that are detachable from each other (illustrated as spine portions 25a-c), wherein each spine subassembly portion may include at least one transverse subassembly 22b-e. If the spine 22a is a plurality of spine portions 25a-c, as shown in FIG. 6, appropriate blade sections can be associated with each spine portion to form a plurality of assembled rotorblade portions, illustrated as rotorblade portions 27a-c, wherein each assembled rotorblade portion includes at least one blade section and at least one spine subassembly portion. The plurality of assembled rotorblade portions may be created and transported before they are bonded to form a complete rotorblade 10. This aids in transportation by allowing smaller (as compared to an entire rotorblade 10), readily bondable structures to be transported to a desired location.

Referring to FIG. 7, a detailed association between rotorblade sections and the at least one transverse subassembly is illustrated. The section 16a is shown in association with section 16c, which in turn is shown in association with transverse subassembly 22b. Both associations are accomplished via bonding using an adhesive 23a and 23b. In the illustration, the section 16c includes a flange 26, including a section bonding side 26a and a subassembly bonding side 26b. The subassembly bonding side 26b of the flange 26 is bondingly associated with the transverse subassembly 22b, and the section 16a is bondingly associated with the section bonding side 26a of the flange 26, wherein the transverse subassembly 22b and spine subassembly 22a support the sections 16a and 16c as they are bonded to each other. This illustration is demonstrative of a process by which the plurality of rotorblade sections benefits from the support of at least one subassembly before, during, and after a bonding process.

Figure 8:
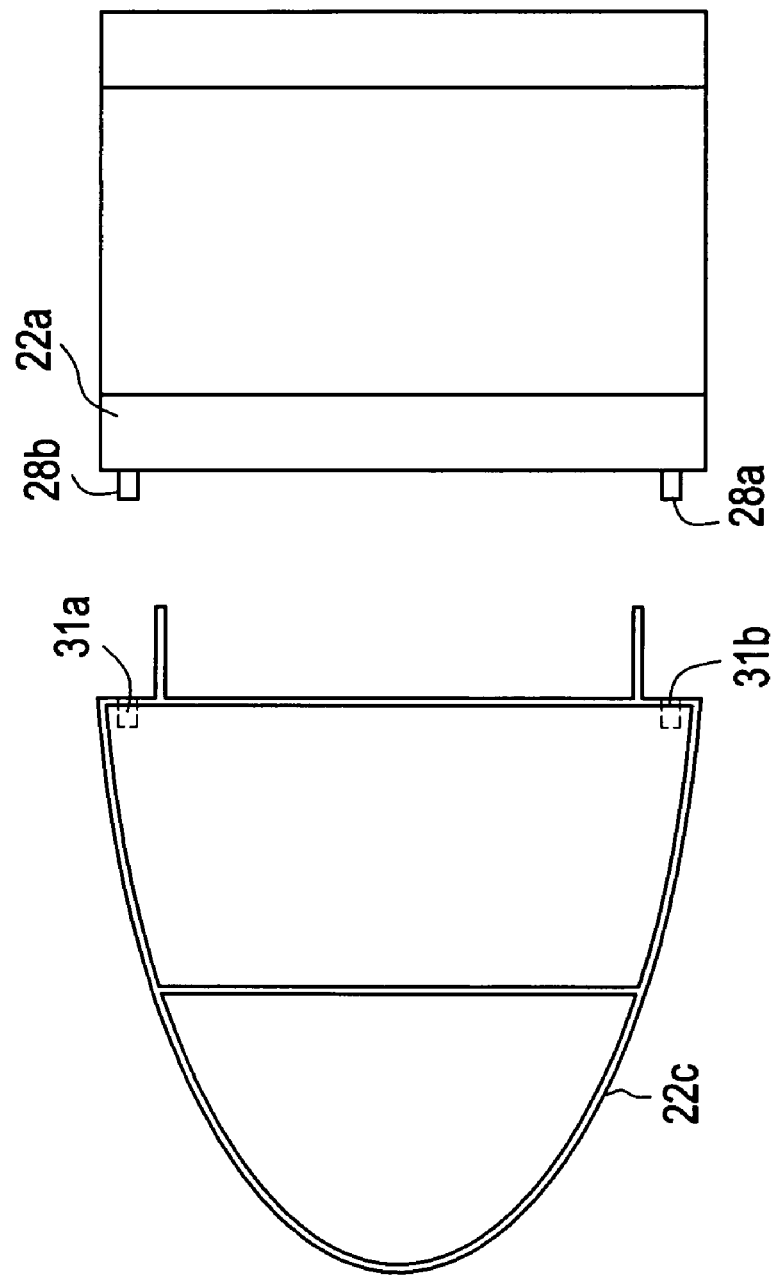
FIG. 8 is a side perspective view of a subassembly including locating features in accordance with the exemplary embodiment.
Figure 9:
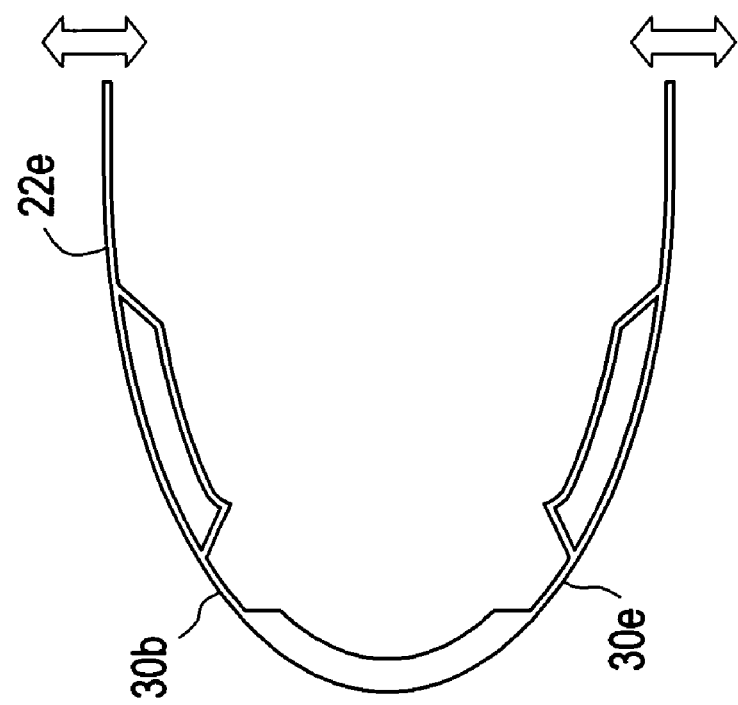
FIG. 9 is a side perspective view of a subassembly including flex points in accordance with the exemplary embodiment.

Referring to FIG. 8, it should be appreciated that the transverse subassemblies 22b-e, transverse subassembly 22c in the illustration, may be moveably associated with the spine subassembly 22a via locating features 28a and 28b included in the subassembly 22a, and locating cavities 31a and 31b defined by the transverse subassembly 22c. This removeable association allows variable positioning of the transverse subassemblies 22b-e along the spine subassembly 22a, which in turn allows variable positioning of the at least one bond line. It should be additionally appreciated referring to FIG. 9, that transverse subassemblies 22b-e, transverse subassembly 22e in the illustration, may include at least one flex point, illustrated as flex points 30a and 30b, wherein the flex points 30a and 30b allow a subassembly flexibility that aids in configuring pre-bonded rotorblade sections during construction. The subassemblies 22a-e may also include physical features used for blade alignment, and physical features used for subassembly lifting, shipping support, and/or handling.

It should be further appreciated that although the plurality of rotorblade sections are shown in bonded association with the at least one subassembly, these associations may be achieved via any means necessary to the desired end purpose, such as but not limited to adhesive bonding, welding, and threaded affixing. The plurality of rotorblade sections may also include internal features that aid in blade structure, lightning protection, and erosion protection.

Figure 10:
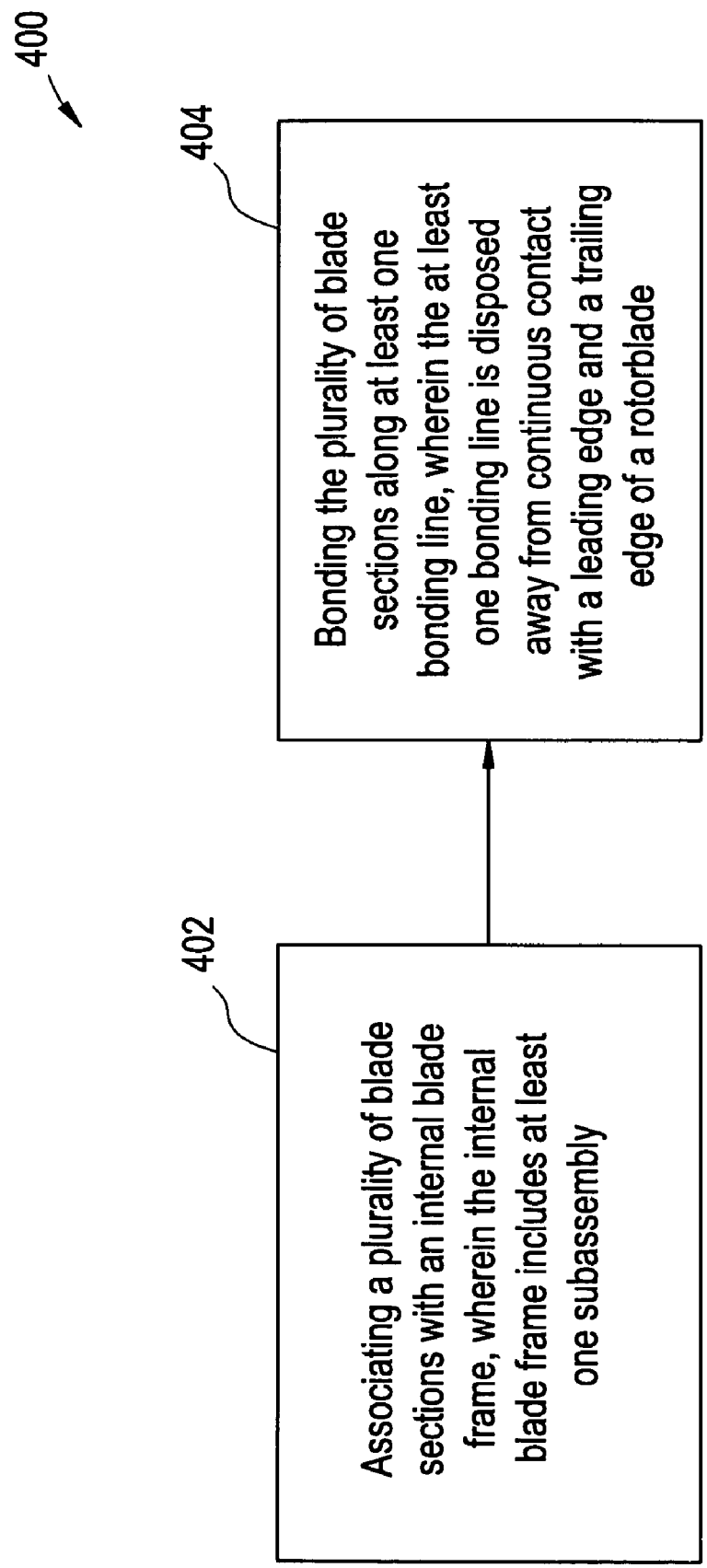
FIG. 10 is a block diagram illustrating a method for constructing rotorblades.

Referring to FIG. 10, a method 400 for constructing a modular rotorblade 10 is illustrated and includes associating a plurality of blade sections 16a-f with an internal blade frame, wherein the blade frame includes at least one subassembly 22a-e, as shown in Operational Block 404. The method 400 also includes bonding the plurality of blade sections 16a-f along at least one bonding line 20a-d, wherein the at least one bonding line 20a-d is disposed away from continuous contact with a leading edge 12 and a trailing edge 14 of a rotorblade 10, as shown in Operational Block 404. It should be appreciated that at least one of the plurality of blade sections 16a-f may be associated via bonding with the at least one subassembly 22a-e along the at least one bonding line 18a-b and 20a-d.

Figure 11:
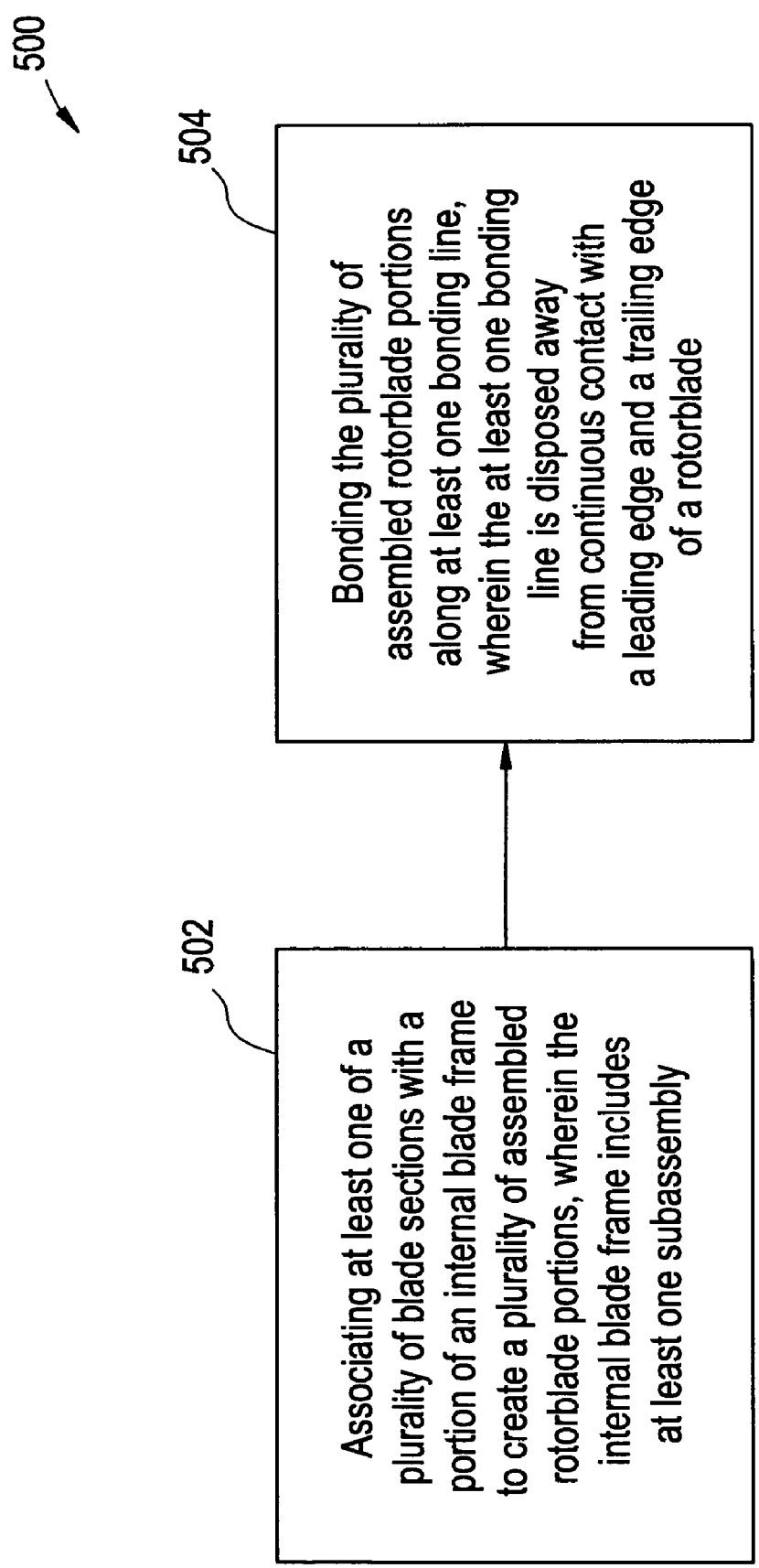
FIG. 11 is a block diagram illustrating a second method for constructing rotorblades.

Referring to FIG. 11, a method 500 for constructing a modular rotorblade 10 is illustrated and includes associating at least one of a plurality of blade sections 16a-f with a portion of an internal blade frame (such as a spine subassembly portion 24a-c) to create a plurality of assembled rotorblade portions 27a-c, wherein the blade frame includes at least one subassembly 22a-e, as shown in Operational Block 502. It should be appreciated that each assembled rotorblade portion 27a-c includes at least one blade section (if two or more blade sections are present in a portion, those blade sections may be bonded to each other) and a portion of the internal blade frame.

The method 500 also includes bonding the plurality of assembled rotorblade portions 27a-c along at least one bonding line 18a-b and 20a-d, wherein the at least one bonding line 18a-b and 20a-d is disposed away from continuous contact with a leading edge 12 and a trailing edge 14 of a rotorblade 10, as shown in Operational Block 504. It should be appreciated that at least one of the plurality of blade sections 16a-f may be associated via bonding with the at least one subassembly 22a-e along the at least one bonding line 18a-b and 20a-d.

While the invention has been described with reference to an exemplary embodiment, it should be understood by those skilled in the art that various changes may be made and equivalents may be substituted for elements thereof without departing from the scope of the invention. In addition, many modifications may be made to adapt a particular situation or substance to the teachings of the invention without departing from the scope thereof. Therefore, it is important that the invention not be limited to the particular embodiment disclosed as the best mode contemplated for carrying out this invention, but that the invention will include all embodiments falling within the scope of the apportioned claims. Moreover, unless specifically stated any use of the terms first, second, etc. do not denote any order or importance, but rather the terms first, second, etc. are used to distinguish one element from another.

What is claimed is:

1. A modularly constructed rotorblade including a leading and a trailing edge, the rotorblade comprising:
   at least one spine subassembly and at least one transverse subassembly moveably associated with said spine subassembly;
   a plurality of rotorblade sections in adhesively bonded association via an adhesive disposed between said plurality of rotorblade sections, each of said plurality of rotorblade sections being constructed of a material that is substantially the same; and
   at least one bonding line created by said adhesively bonded association and disposed at an external surface of the rotorblade between and in contact with adjacent sections of said rotorblade sections, and positioned in a blade chord area between the leading edge and the trailing edge of the rotorblade, and in parallel with the spine subassembly.

2. A rotorblade according to claim 1, wherein said plurality of rotorblade sections are at least three rotorblade sections delimited at said external surface of the rotorblade.

3. A rotorblade according to claim 1, wherein said at least one bonding line is at least three bonding lines disposed at said external surface of the rotorblade.

4. A rotorblade according to claim 1, wherein said plurality of blade sections includes internal features that aid in blade structure, lightning protection, and erosion protection.

5. The rotorblade according to claim 1, wherein the bonding line extends along substantially a longitudinal length of the rotorblade.

6. The rotorblade according to claim 1, wherein the bonding line extends along at least half a longitudinal length of the rotorblade.

7. A modularly constructed rotorblade including a leading and a trailing edge, the rotorblade comprising,
   a plurality of rotorblade sections in bonded association, each of said plurality of rotorblade sections being constructed of a material that is substantially the same; and
   at least one bonding line created by said bonded association and disposed at an external surface of the rotorblade between and in contact with adjacent sections of said rotorblade sections, and positioned in a blade chord area between the leading edge and the trailing edge of the rotorblade,
   wherein said plurality of rotorblade sections are associated with an internal blade frame, said internal blade frame including at least one spine subassembly in parallel with the bonding line and at least one transverse subassembly moveably associated with said spine subassembly.

8. A rotorblade according to claim 7, wherein said at least one subassembly includes physical features used for blade alignment, subassembly lifting, shipping support, and/or handling.

9. A rotorblade according to claim 7, wherein said plurality of rotorblade sections are associated with said at least one subassembly along said at least one bonding line.

10. A rotorblade according to claim 7, wherein said plurality of rotorblade sections are bonded to said at least one subassembly along said at least one bonding line.

11. A rotorblade according to claim 7, wherein said at least one spine subassembly includes a plurality of spine subassembly portions.

12. A rotorblade according to claim 7, wherein said at least one subassembly includes at least one flex point.

13. A method for constructing rotorblades, the method comprising:
   associating a plurality of rotorblade sections with an internal blade frame, wherein said internal blade frame includes at least one subassembly, and wherein each of said plurality of rotorblade sections being constructed of a material that is substantially the same; and
   bonding said plurality of blade sections along at least one bonding line, wherein said at least one bonding line is disposed at an external surface of the rotorblade between and in contact with adjacent sections of said rotorblade sections, and extends continuously within the blade chord area from a first end adjacent to a rotorblade hub to a distal end of a rotorblade tip.

14. A method according to claim 13, further including associating at least one of said plurality of blade sections with said at least one subassembly along said at least one bonding line.

15. A method according to claim 13, further including bonding at least one of said plurality of blade sections to said at least one subassembly along said at least one bonding line.

16. A method for constructing rotorblades, the method comprising:
   associating at least one of a plurality of rotorblade sections with a portion of an internal blade frame to create a plurality of assembled rotorblade portions, wherein said blade frame includes at least one subassembly, and wherein each of said plurality of rotorblade sections being constructed of a material that is substantially the same; and bonding said plurality of assembled rotorblade portions along at least one bonding line, wherein said at least one bonding line is disposed at an external surface of the rotorblade between and in contact with adjacent sections of said rotorblade sections, and positioned in a blade chord area between a leading edge and a trailing edge of a rotorblade to extend continuously from a first end adjacent to a rotorblade hub to a distal end of a rotorblade tip.

17. A method according to claim 16, further including associating at least one of said plurality of blade sections with said at least one subassembly along said at least one bonding line.

18. A method according to claim 16, further including bonding at least one of said plurality of blade sections to said at least one subassembly along said at least one bonding line.

19. A modularly constructed rotorblade including a leading and a trailing edge, the rotorblade comprising:

a plurality of rotorblade sections in adhesively bonded association via an adhesive disposed between said plurality of rotorblade sections; and at least one bonding line created by said adhesively bonded association, which is disposed between said rotorblade sections, disposed to intersect at least one of the leading edge and the trailing edge at an external surface of the rotorblade and extends continuously within a blade chord area from a first end adjacent to a rotorblade hub to a distal end of a rotorblade tip.

* * * * *